(12) United States Patent
Kennedy et al.

(10) Patent No.: US 10,451,487 B1
(45) Date of Patent: Oct. 22, 2019

(54) PER-PIXEL DARK REFERENCE BOLOMETER

(71) Applicant: RAYTHEON COMPANY, Waltham, MA (US)

(72) Inventors: Adam M. Kennedy, Santa Barbara, CA (US); Eli E. Gordon, Santa Barbara, CA (US); Eric J. Beuville, Goleta, CA (US); Ryan Paul Boesch, Goleta, CA (US); Jeffrey K. Hamers, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 16/110,367

(22) Filed: Aug. 23, 2018

(51) Int. Cl.
*G01J 5/20* (2006.01)
*G01J 5/06* (2006.01)
(Continued)

(52) U.S. Cl.
CPC . *G01J 5/20* (2013.01); *G01J 5/06* (2013.01); *G01J 5/52* (2013.01);
(Continued)

(58) Field of Classification Search
CPC ..................... G01J 5/52; G01J 5/20
(Continued)

(56) References Cited

U.S. PATENT DOCUMENTS

| | | | |
|---|---|---|---|
| 6,064,066 A * | 5/2000 | Bevan | G01J 5/20 250/252.1 |
| 7,262,412 B2 | 8/2007 | Schimert et al. | |

(Continued)

FOREIGN PATENT DOCUMENTS

| | | |
|---|---|---|
| EP | 0798545 A1 | 10/1997 |
| JP | 2004364241 A | 12/2004 |

(Continued)

OTHER PUBLICATIONS

Parish et al. "Low Cost 160 × 128 uncooled infrared sensor array", SPIE (1998).
(Continued)

*Primary Examiner* — Yara B Green
(74) *Attorney, Agent, or Firm* — Lando & Anastasi, LLP

(57) ABSTRACT

Microbolometer arrays incorporating per-pixel dark reference structures for non-uniformity correction. In one example a thermal imager includes a device substrate, a microbolometer array disposed on the device substrate and including a plurality of detector elements arranged in a two-dimensional array, each detector element including an imaging microbolometer and a reference microbolometer, the imaging microbolometer being configured to receive electromagnetic radiation from a viewed scene and to produce an image signal in response to receiving the electromagnetic radiation, the image signal including a component produced due to thermal noise in the respective detector element, and the reference microbolometer being shielded from receiving the electromagnetic radiation and configured to produce a reference signal indicative of the thermal noise, wherein the thermal imaging device is configured to produce an image of the viewed scene based on a combination of the image signals and the reference signals from the plurality of detector elements.

18 Claims, 6 Drawing Sheets

(51) Int. Cl.
*G01J 5/52* (2006.01)
*G01J 5/00* (2006.01)

(52) U.S. Cl.
CPC .............. *G01J 2005/0048* (2013.01); *G01J 2005/0077* (2013.01); *G01J 2005/202* (2013.01)

(58) Field of Classification Search
USPC ...................................................... 250/338.1
See application file for complete search history.

(56) References Cited

U.S. PATENT DOCUMENTS

| | | | |
|---|---|---|---|
| 2013/0240738 A1 | 9/2013 | Yon et al. | |
| 2014/0166882 A1* | 6/2014 | Oulachgar | G01J 5/20 250/338.4 |
| 2015/0226613 A1 | 8/2015 | Bauer et al. | |
| 2017/0016762 A1 | 1/2017 | Van Buggenhout et al. | |
| 2017/0074725 A1* | 3/2017 | Roehrer | G01J 5/20 |

FOREIGN PATENT DOCUMENTS

| | | |
|---|---|---|
| JP | 2009168611 A | 7/2009 |
| WO | 2006062809 A2 | 6/2006 |

OTHER PUBLICATIONS

Chesler, T.A. "Design of Pixel Level CMOS Readout Circuitry for Continuous Bias Uncooled Bolometric Long wave Infrared Focal Plane Arrays", University of Maryland Department of Electrical and Computer Engineering (2004).

Alacoque et al. "A 128×128, 34mm pitch, 8.9mW, 190mK NETD, TECless Uncooled IR bolometer image sensor with column-wise processing", Society for Imaging Science and Technology (2017), pp. 68-73.

Invitation to Pay Additional Fees in application No. PCT/US2019/029615 dated Aug. 8, 2019.

Pope et al. "Microbolometer Detector Array for Satellite-Based Thermal Infrared Imaging", Proceedings of the 2004 International Conference on MEMS, NANO and Smart Systems (2004) pp. 310-314.

Phong et al. "Linear Arrays of Microbolometers for Space Applications", IEEE Sensors Conference (2008), pp. 1344-1347.

"Microbolometer" Wikipedia, (2017), retrieved from the Internet: https://web.archive.org/web/20171229085010/https://en.wikipedia.org/wiki/Microbolometer.

\* cited by examiner

PER-PIXEL DARK REFERENCE BOLOMETER

BACKGROUND

Various types of infrared sensors have been developed and are used for a wide variety of thermal imaging applications. MEMS-based microbolometers generally include a substrate having thereon a focal plane array (FPA), the FPA including a plurality of detector elements that each correspond to a respective pixel in the image produced by the sensor. Accordingly, individual detector elements may be generally referred to herein as pixels. An infrared-transparent cover, or lid structure, is placed over the FPA and attached to the substrate to provide a vacuum environment in which the MEMS-based microbolometer can operate. These lids are often coated with an anti-reflective coating to reduce the reflective properties and increase the infrared transmission properties of the lid. The substrate contains an integrated circuit which is electrically coupled to the detector elements, and which is commonly known as a read out integrated circuit (ROIC) and which is used to integrate the signal from each pixel and multiplex the signals off the chip with appropriate signal conditioning and processing. Each pixel includes a membrane which is suspended at a location spaced above the top surface of the substrate, in order to facilitate thermal isolation. The membrane includes a thermally sensitive material, such as amorphous silicon (a-Si) or vanadium oxide (VOx). The membrane also includes two electrodes, which are each coupled to the thermally sensitive material, and which are also coupled to the ROIC in the substrate. As the temperature of the thermally sensitive material varies, the resistance of the thermally sensitive material also varies, and the ROIC in the substrate can determine the amount of thermal energy which has been received at a pixel by sensing the corresponding resistance change of that pixel.

As the microbolometers have been made more sensitive to incoming electromagnetic radiation, they have also become more sensitive to effects of self-heating, which causes a change in the intensity output from the pixels of the array. Changes in the intensity outputs tend to be non-uniform across the many detector elements of the array, causing different pixels receiving the same input radiation to produce different outputs, and contributing to noise in the image.

One approach to non-uniformity correction (NUC) in uncooled microbolometer arrays is to periodically shutter the FPA (or shutter the lens that focuses incident electromagnetic radiation onto the FPA) for a few seconds to allow for a non-uniformity correction of the image to be calculated. Some conventional uncooled infrared microbolometers operating at ambient temperature and without the use of active temperature stabilization use infrared optically blind reference pixels that do not absorb incident infrared radiation to provide reference measurements that can be used for NUC. These infrared optically blind reference pixels are used to determine ambient temperature of the focal plane which is required in the calibration of the focal plane array over the operating temperature of the focal plane array. This involves implementation of a gain and offset correction algorithm at any given temperature (sensed by the reference pixels) to the active detector elements in order to correct the image for ambient temperature drift effects, e.g., in an imaging focal plane array. The reference pixels are generally placed on the sides of the rows or columns of the FPA to compensate for non-uniformity by continuously normalizing the row-to-row or column-to-column non-uniformity. However, non-uniformities also occur within the rows and columns, requiring the image to be corrected using a shutter. Another method of non-uniformity correction is known as scene-based NUC, which requires the viewed scene to be changing and may involve complex image processing.

SUMMARY OF INVENTION

Substantial non-uniformities that exist across an uncooled microbolometer array cause difficulties in subtracting out the local noise from the signal produced by the array. As discussed above, various non-uniformity correction (NUC) approaches have used reference pixels located at either the end of the rows or the end of the columns of the array. In addition, some NUC approaches have used reference pixels dispersed over the array or a portion thereof. Conventional approaches, however, have limitations and do not necessary provide the noise improvement performance desired for certain applications. Accordingly, aspects and embodiments are directed to NUC that can be implemented on a per-pixel basis, and therefore may provide improved performance and/or other benefits (such as obviating the need for a movable shutter) over conventional approaches.

According to one embodiment, a thermal imaging device comprises a read-out integrated circuit (ROIC) substrate, and a microbolometer array disposed on the ROIC substrate and including a plurality of detector elements arranged in a two-dimensional array. Each detector element includes an imaging microbolometer and a reference microbolometer, the imaging microbolometer being configured to receive electromagnetic radiation from a viewed scene and to produce an image signal in response to receiving the electromagnetic radiation, the image signal including a component produced due to thermal noise in the respective detector element, and the reference microbolometer being shielded from receiving the electromagnetic radiation and configured to produce a reference signal indicative of the thermal noise. The thermal imaging device is configured to produce an image of the viewed scene based on a combination of the image signals and the reference signals from the plurality of detector elements.

In one example the imaging microbolometer of each detector element includes a layer of thermally sensitive material suspended above the ROIC substrate, wherein the reference microbolometer of each detector element includes a reference resistor made of the thermally sensitive material. The thermally sensitive material may be vanadium oxide or amorphous silicon, for example. In one example the reference bolometer is configured with a geometry that mimics a geometry of the imaging microbolometer. In another example the reference resistor is disposed on the ROIC substrate, and each detector element further includes a layer of infrared reflecting material disposed over the reference resistor and configured to shield the reference microbolometer from receiving the electromagnetic radiation. In another example each detector element further includes circuitry configured to subtract the reference signal from the image signal to produce a corrected image signal, and wherein the thermal imaging device is configured to produce the image of the viewed scene from the corrected image signals from each detector element. In one example the circuitry includes a pair of complementary transistors connected in series between the reference microbolometer and the imaging microbolometer. In one example the electromagnetic radiation is infrared radiation having wavelengths in a range of 8-12 micrometers. The thermal imaging device may further comprise a ROIC implemented in the ROIC substrate and coupled to the microbolometer array, the ROIC being configured to process the image signals and the reference signals from the plurality of detector elements to produce the image of the viewed scene.

Another embodiment is directed to a thermal imaging method. The thermal imaging method may comprise acts of receiving electromagnetic radiation from a viewed scene at an imaging microbolometer of each of a plurality of detector elements of a microbolometer array, producing, from the imaging microbolometer included in each of the plurality of detector elements, an image signal from a combination of the received electromagnetic radiation and thermal noise in the respective detector element, producing, from a reference microbolometer included in each of the plurality of detector elements, a reference signal based on the thermal noise, the reference microbolometer being shielded from receiving the electromagnetic radiation, for each detector element, subtracting the reference signal from the image signal to produce a corrected image signal, and producing an image of the viewed scene based on the corrected image signals from the plurality of detector elements.

In one example of the method receiving the electromagnetic radiation from the viewed scene includes receiving infrared radiation having wavelengths in a range of 8-12 micrometers.

According to another embodiment, a thermal imaging device comprises a read-out integrated circuit (ROIC) substrate, and a microbolometer array disposed on the ROIC substrate and including a two-dimensional array of detector elements. Each detector element includes a reference resistor formed on a first surface of the ROIC substrate, the reference resistor being formed of a thermally sensitive material and configured to produce a reference signal representative of thermal noise in the detector element, a reflector disposed over the reference resistor and the first surface of the ROIC substrate, the reflector being formed of an infrared reflecting material and configured to shield the reference resistor from receiving electromagnetic radiation from a scene viewed by the microbolometer array, and an imaging microbolometer suspended above the reflector and thermally isolated from the ROIC substrate by a pair of thermal isolation legs, the imaging microbolometer including a layer of the thermally sensitive material supported by a support layer, and being configured to receive the electromagnetic radiation from the viewed scene and to produce an image signal based on the received electromagnetic radiation and the thermal noise in the detector element. The thermal imaging device further includes circuitry formed in the ROIC substrate and coupled to the microbolometer array and configured to, for each detector element, subtract the reference signal from the image signal to produce a corrected image signal, and to produce an image of the viewed scene based on the corrected image signals from the plurality of detector elements.

In one example the thermally sensitive material is vanadium oxide. In another example the thermal imaging device further comprises a lid wafer coupled to the ROIC substrate and configured to provide a cavity over the microbolometer array. The lid wafer may include a region that is optically transparent to the electromagnetic radiation to allow the electromagnetic radiation to be received at the microbolometer array. In one example the electromagnetic radiation is infrared radiation having wavelengths in a range of 8-12 micrometers. In another example the infrared reflecting material is aluminum.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments disclosed herein, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
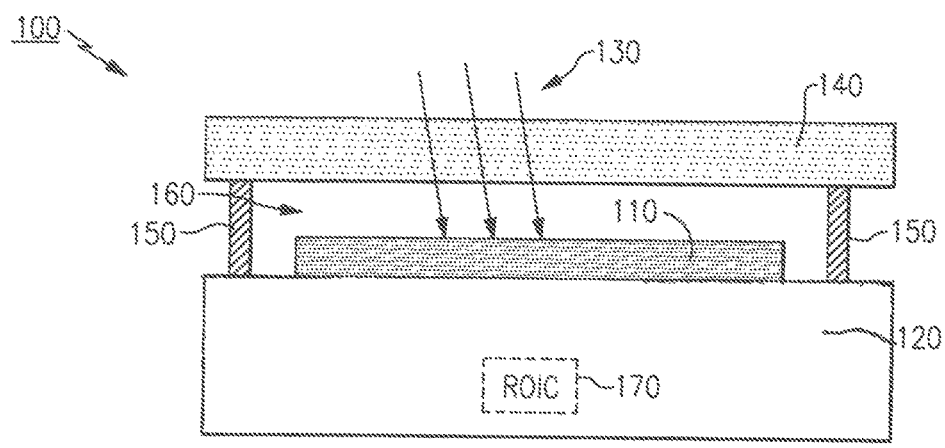
FIG. 1 is a simplified cross-sectional block diagram of one example of a microbolometer according to aspects of the present invention.

As discussed above, substantial non-uniformities exist across an uncooled microbolometer array. These non-uniformities can create significant difficulties in subtracting out the local noise from the signal of interest produced by the array. Although there are various methods for compensating for non-uniformities in the pixel responses, many approaches have associated drawbacks that render them undesirable in certain applications or limit their effectiveness. For example, active non-uniformity correction (NUC), which involves applying a continuous bias voltage for each individual pixel of the array may require too much power for many applications. As discussed above, some conventional approaches to NUC use optically blind reference pixels located at the ends of columns or rows of the array; however, these do not track changes in individual pixel resistance very well. The resistance or performance of the thermally sensitive material used to make each pixel can vary substantially from pixel to pixel across an array, across a wafer (die to die variation), from wafer to wafer, and from wafer lot to wafer lot, and this variation may be difficult to track. Aspects and embodiments provide a method and apparatus by which non-scene-based non-uniformities (i.e., noise) in the pixel responses can be measured on a per-pixel basis, thereby offering substantial improvement in the imaging performance of a microbolometer array.

As discussed in more detail below, according to certain embodiments, each pixel in an array includes both an imaging detector element and an optically blind reference element. The reference elements have a physical shield over them such that they do not "see" the scene imagery, and can therefore act as a reference because their outputs are responsive solely to thermal noise. The reference elements can be constructed from the same thermally sensitive material as the corresponding imaging detector elements, and have the same or very similar dimensions, such that their resistance value is essentially the same as that of the corresponding imaging detector element and their response to received thermal noise is therefore very similar to the response of the corresponding imaging detector element. The reference elements thus may provide a good match locally to both temperature and resistance changes, and allow for local impacts to be removed from image on a per-pixel basis rather than only on a per-row or per-column basis.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Figure 2:
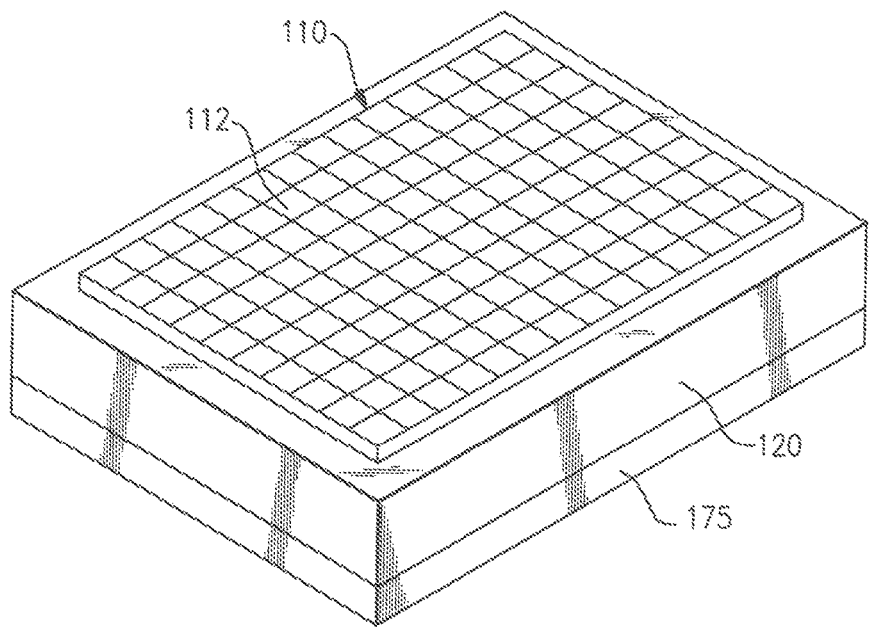
FIG. 2 is a simplified perspective view of one example of a microbolometer array that may include the microbolometer of FIG. 1 according to certain aspects.

FIG. 1 is a schematic simplified cross-sectional block-diagram of one example of an infrared sensor 100 including a microbolometer array and which may be used to detect thermal energy and output electrical signals representative of a two-dimensional image of that detected thermal energy. In the illustrated example, the infrared sensor 100 includes a focal plane array (FPA) 110 disposed on a read-out integrated circuit (ROIC) wafer or substrate 120. A ROIC 170, which may include various electronic components as is understood by those skilled in the art, is implemented in the ROIC substrate 120. As shown in FIG. 2, the FPA 110 may include a plurality of thermal sensors or detector elements 112. The detector elements 112 are arranged in a two-dimensional (n×m) array, and each detector element 112 corresponds to a respective pixel in each image produced by the infrared sensor 100. Although FIG. 2 diagrammatically depicts only about 140 detector elements 112, it will be appreciated by those skilled in the art that the total number of detector elements 112 in the FPA 110 may be larger or smaller. In some implementations, the FPA 110 is an uncooled microbolometer array configured to receive and detect electromagnetic radiation in the at least a portion of the thermal infrared spectral region. For example, the FPA 110 may be sensitive to electromagnetic radiation in the long-wave infrared spectral band or having a wavelength in a range of approximately 8-12 µm.

Referring to FIG. 1, the FPA 110 receives electromagnetic radiation 130 from a viewed scene via an optically transparent lid wafer or window 140. The lid wafer 140 is coupled to the ROIC substrate 120 and suspended over the FPA 110 by support structure(s) 150 such that a cavity 160 is formed between the ROIC substrate 120 and the lid wafer 140. In certain embodiments, the cavity 160 can provide a vacuum environment in which the FPA 110 may operate. The ROIC substrate 120 may be composed of silicon and for a vacuum or sealed enclosure a hermetic bond is then formed between the ROIC substrate 120 and the support structure 150. Additionally, a hermetic bond may be formed between the support structure 150 and the window 140. An optically transparent silicon wafer may be employed for the lid wafer 140, although any other suitable infrared transparent lid wafer material (e.g., such as germanium, zinc selenide, or zinc sulfide, etc.) may alternatively be used. In certain examples the lid wafer 140 is composed of germanium due to its high index of refraction and dispersion.

The FPA 110 receives the electromagnetic radiation 130 from the viewed scene and produces an image therefrom. In particular, each detector element 112 converts the electromagnetic radiation it receives into an electrical signal that is output to the ROIC 170 for processing. The ROIC 170 integrates the thermally induced electrical signals from each detector element (pixel) 112 in the focal plane array 110 and multiplexes the signals off the array with the appropriate signal conditioning and processing. In the example shown in FIG. 1, the ROIC 170 is included the ROIC substrate 120. In certain examples, thermal management components, such as a heat sink, may be integrated with the ROIC substrate 120 or may be provided in a substrate 175 or other structure coupled to the ROIC substrate 120.

The detector elements 112 of the FPA 110 are sensitive to the electromagnetic radiation 130 (i.e., produce signals in response to receiving the electromagnetic radiation 130 that are used to generate an image of the viewed scene), but as discussed above, may also be sensitive to thermal radiation received from elsewhere, leading to noise in the image. For example, components of the ROIC 170, or electrical components associated with the detector elements 112, such as row and/or column amplifiers, may heat up in operation, causing additional thermal radiation to be received by the detector elements 112. As discussed above, as the detector elements 112 are made more and more sensitive to allow for better thermal imaging performance, they also become more sensitive to noise, particularly noise caused by self-heating. The detector elements 112 may be highly sensitive to their own heat, in some designs measuring their own temperature many times better than they measure the incident electromagnetic radiation 130. In addition, tiny changes in temperature, for example, only milli-Kelvins of thermal radiation, may significantly impact the imaging performance of the detector elements 112. Adding to this problem, which significantly impacts the signal-to-noise ratio in the image produced by the FPA 110, is the fact that not all detector elements 112 in the array receive the same thermal noise radiation, heat up at the same rate, and/or measure their own temperatures to the same precision. Thus, there are non-uniformities in the photo-response of the detector elements 112 that are unrelated to the received incident electromagnetic radiation 130 from the viewed scene.

Accordingly, aspects and embodiments provide a pixel structure for thermal imaging arrays in which each pixel 112 includes both an imaging detector element and a reference element, such that thermal noise can be detected and mitigated on a per-pixel basis. By detecting and subtracting the noise response from the output of each individual pixel 112, the impact of non-uniformities in the noise responses on the imaging performance of the FPA 110 is significantly reduced relative to conventional designs in which NUC is performed on some aggregate of the pixels (e.g., by row or column).

Figure 3:
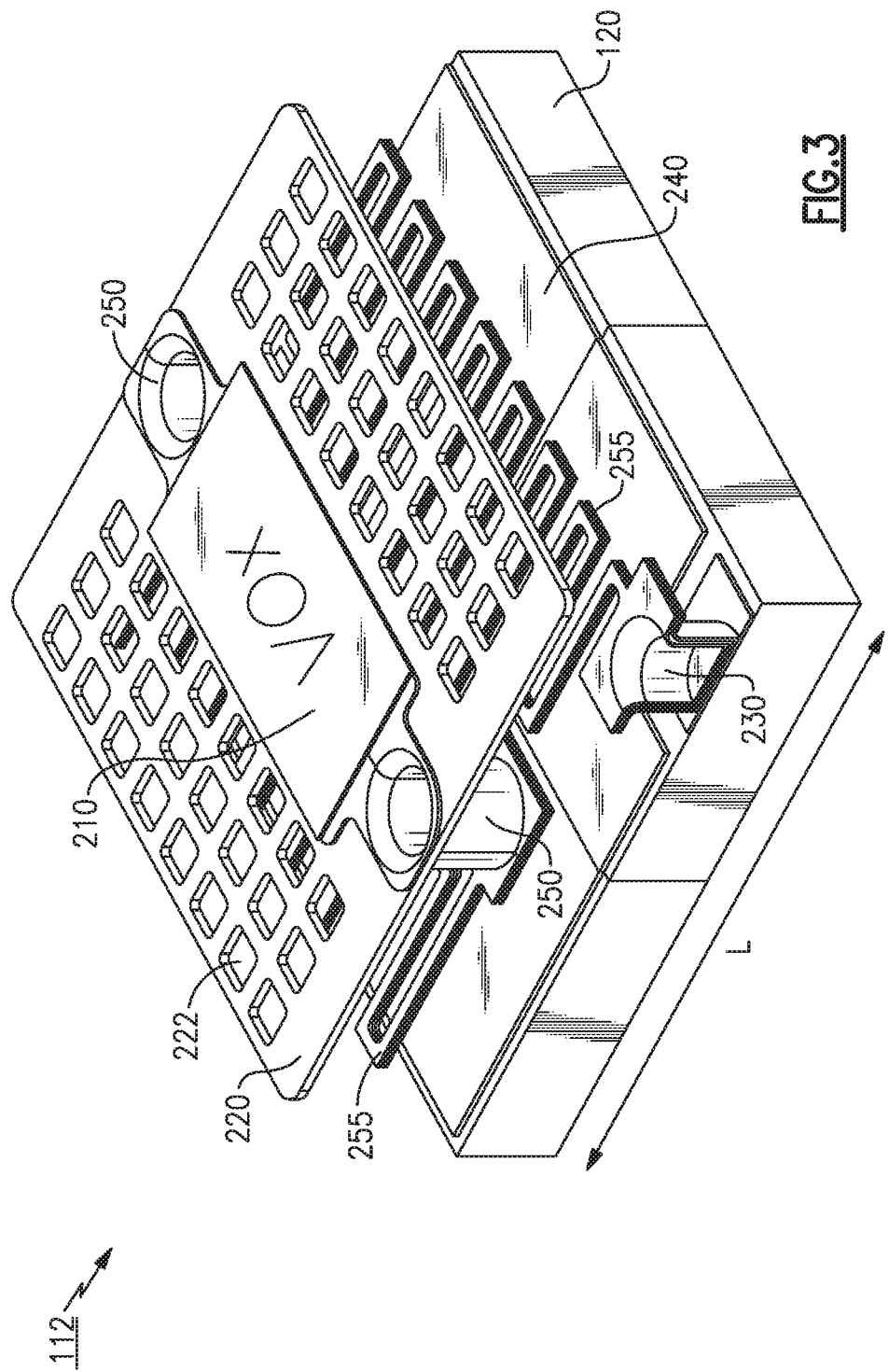
FIG. 3 is a diagram of one example of a detector element as may be included in the microbolometer array of FIG. 2 according to aspects of the present invention.
Figure 4:
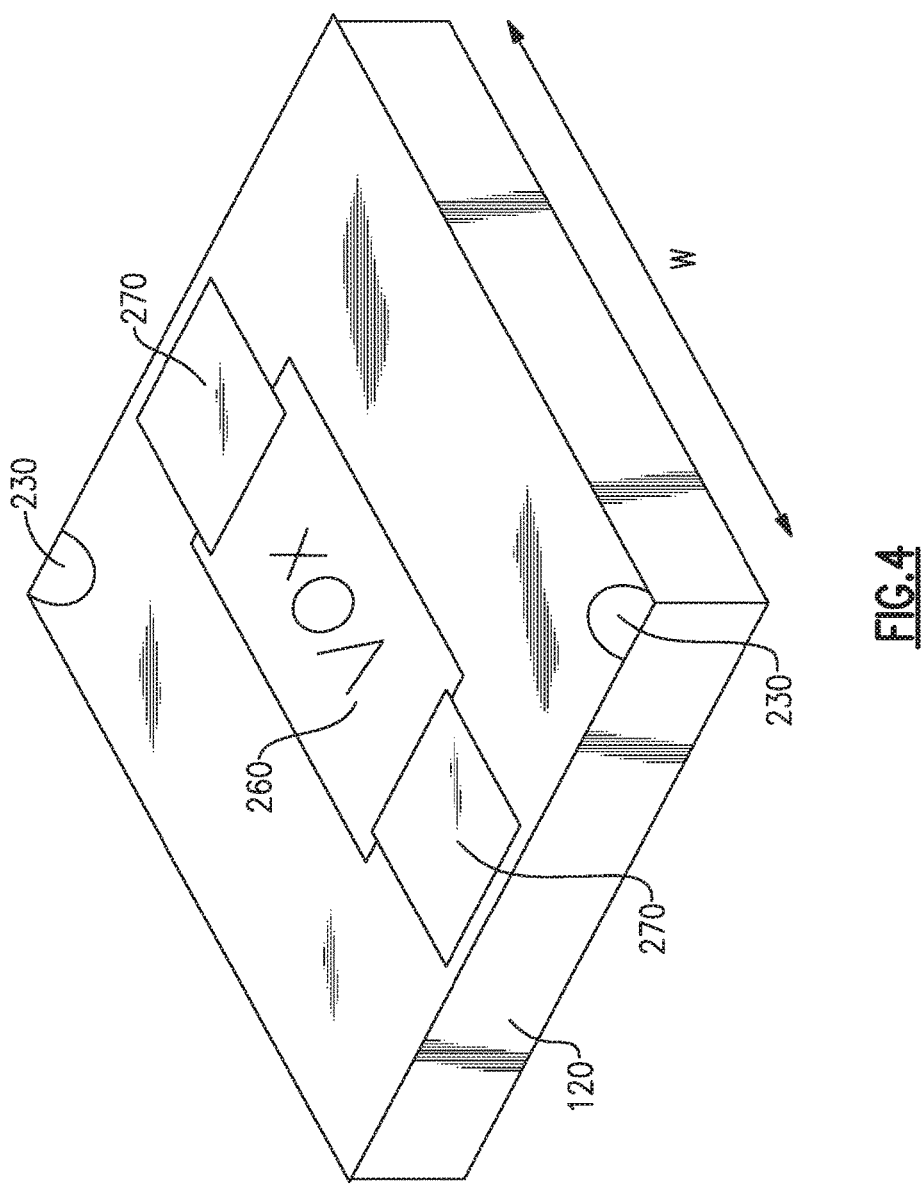
FIG. 4 is a diagram of a portion of the detector element of FIG. 3 showing a reference resistor according to aspects of the present invention.

Referring to FIGS. 3 and 4 there is illustrated an example of a pixel 112 that includes an embedded reference element (shown in FIG. 4). FIG. 3 shows imaging components of the pixel 112. According to one embodiment, the imaging detector element of the pixel 112 includes a low thermal mass microbolometer having infrared absorbing detector elements suspended and thermally isolated from the ROIC substrate 120 by relatively long thermal isolation legs. The suspended imaging microbolometer may include a thermally sensitive material 210 supported by a support layer 220. The support layer 220 may be made of silicon nitride, for example. In certain examples the support layer 220 includes a plurality of small holes 222 to reduce the thermal mass of the support layer. The holes 222 are sized to be much smaller than the wavelength of the electromagnetic radiation 130 of interest, such that they do not impact the imaging performance of the imaging microbolometer. For example, for an FPA 110 configured to image in the long-wave infrared spectral band (LWIR; approximately 8-12 μm wavelengths), the length L and width W may each be approximately 12 μm; thus, the holes 222 may have dimensions (length and width) on the order of 1 μm. The thermally sensitive material 210 may be vanadium oxide (VOx) or amorphous silicon (a-Si), for example.

As shown in FIG. 4, and partially in FIG. 3, the substrate 120 may have on an upper surface thereof two spaced electrical contacts 230 that are electrically coupled (not shown) to the ROIC 170, which as discussed above, may be implemented within the ROIC substrate 175 and/or the ROIC substrate 120. The top surface of the ROIC substrate 120 has thereon a layer of a material that reflects infrared radiation in at least the spectral band of interest (reflector 240). The imaging microbolometer is suspended above the reflector 240 by supports 250 and thermal isolation legs 255 such that there is a space or gap between the support layer 220 and the reflector 240. In certain examples the distance between the support layer 220 and the reflector 240 is selected to be approximately one-quarter of a wavelength of the electromagnetic radiation 130 of interest, so as to create a resonant cavity which effectively traps the radiation 130 of interest until it can be absorbed by the thermally sensitive material 210. In other examples, the distance between the support layer 220 and the reflector 240 is some other appropriate distance, such as about equal to an odd multiple of one-quarter of a wavelength of the electromagnetic radiation 130 of interest. The reflector 240 may be made of any infrared reflecting material, such as aluminum, for example.

The imaging microbolometer is also electrically connected to the electrical contacts 230 via the supports 250 and the thermal isolation legs 255. Thus, the signals produced by the imaging microbolometer in response to receiving the electromagnetic radiation 130 can be conveyed to the ROIC 170 for processing. The supports 250 may be made of any suitable electrically conductive material, such as titanium, aluminum or titanium-tungsten (TiW), for example. As shown in FIG. 3, in certain embodiments, the thermal isolation legs 255 have a serpentine, or similar, shape to achieve long length in a relatively small area/volume. In certain examples, the length of the thermal isolation legs 255 is approximately equal to or longer than one or more side lengths (e.g., L or W) of the detector element 112, such as a leg length of 12 μm or greater for a 12 μm pixel, for example. In general, longer legs 255 provide more thermal isolation and thus better sensitivity for the FPA 110. In certain examples, thermal isolation legs 255 that are 2-3 times L or W may be used to improve the sensitivity of the detector element 112.

According to certain embodiments, a shielded (optically blind) microbolometer is included within each detector element 112, such that each detector element 112 includes both the imaging microbolometer (imaging pixel) and a reference element/pixel. Referring to FIG. 4, in one embodiment, the reference element includes a reference resistor 260 that is made from the same thermally sensitive material 210. The reference resistor 260 is buried under the reflector 240 and is heat sunk to the ROIC substrate 120. The reference resistor 260 is shielded from the incoming electromagnetic radiation 130 from the scene by the reflector 240. Thus, referring to FIGS. 3 and 4, the reference resistor 260 is "sandwiched" between the reflector 240 and the ROIC substrate 120. The reference resistor 260 can be configured to have a resistance value that is essentially identical to that of the layer of thermally sensitive material 210. This structure provides a reference pixel where there is no scene response (i.e., no signal produced in response to the electromagnetic radiation 130), but changes in the resistance of the reference resistor 260 tracks changes in the resistance of the layer of thermally sensitive material 210 as the temperature of the ROIC substrate 120 and detector element 112 changes. The geometry of the reference resistor 260 can be configured to mimic the geometry in the non-shielded (imaging) portion of the pixel structure. This may provide a pixel 112 in which there is a much better match locally to both temperature and resistance changes.

In certain examples the reference resistor 260 can be aligned with the layer of thermally sensitive material 210, such that it is located beneath the layer of thermally sensitive material and has approximately the same "footprint" on the ROIC substrate 120. As shown in FIG. 4, two pads 270 are coupled to the reference resistor 260. These pads 270 may be electrically conductive and electrically coupled to the ROIC 170 such that a reference signal produced by the reference resistor 260 can be provided to the ROIC 170 for processing along with the signals from the imaging microbolometer. In certain examples, the pads 270 may be aligned with the supports 250; however, in other examples a different geometric arrangement may be implemented. The precise geometry of the reference resistor 260 and associated components (such as the pads 270) may not be critical to the design of the detector element 112, provided that the geometry and materials are such that the reference resistor 260 has a very similar, if not identical, resistance as the imaging microbolometer and a very similar, if not identical, response to changes in temperature as the imaging microbolometer. In particular, forming the reference resistor 260 from the same thermally sensitive material 210 (e.g., vanadium oxide) may be important for accurately matching changes in resistance due to thermal noise. Some designs that attempt to provide per-pixel NUC may utilize a fixed resistor associated with the imaging pixels as a first order reference; however, this approach does not track changing thermal noise in the pixels well. The resistance of thermally sensitive materials, such as vanadium oxide, may change substantially with temperature, and therefore a fixed reference resistance value is not very useful.

Figure 5:
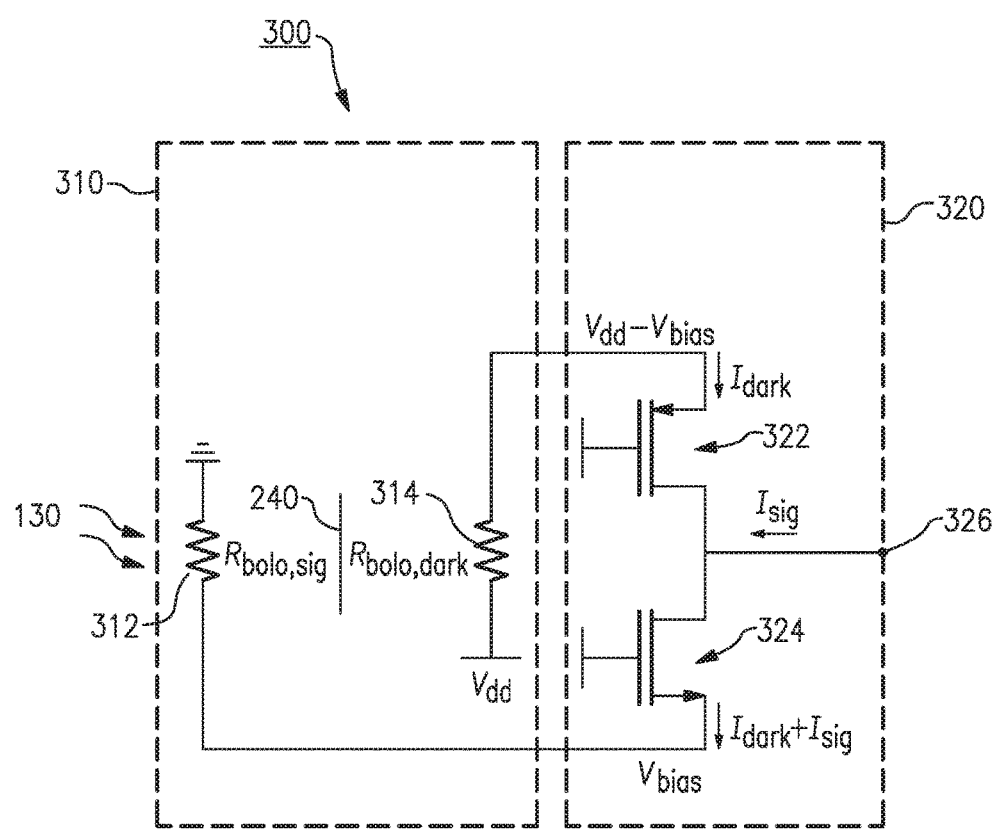
FIG. 5 is a circuit diagram of one example of a thermal imaging device according to aspects of the present invention.
Figure 6:
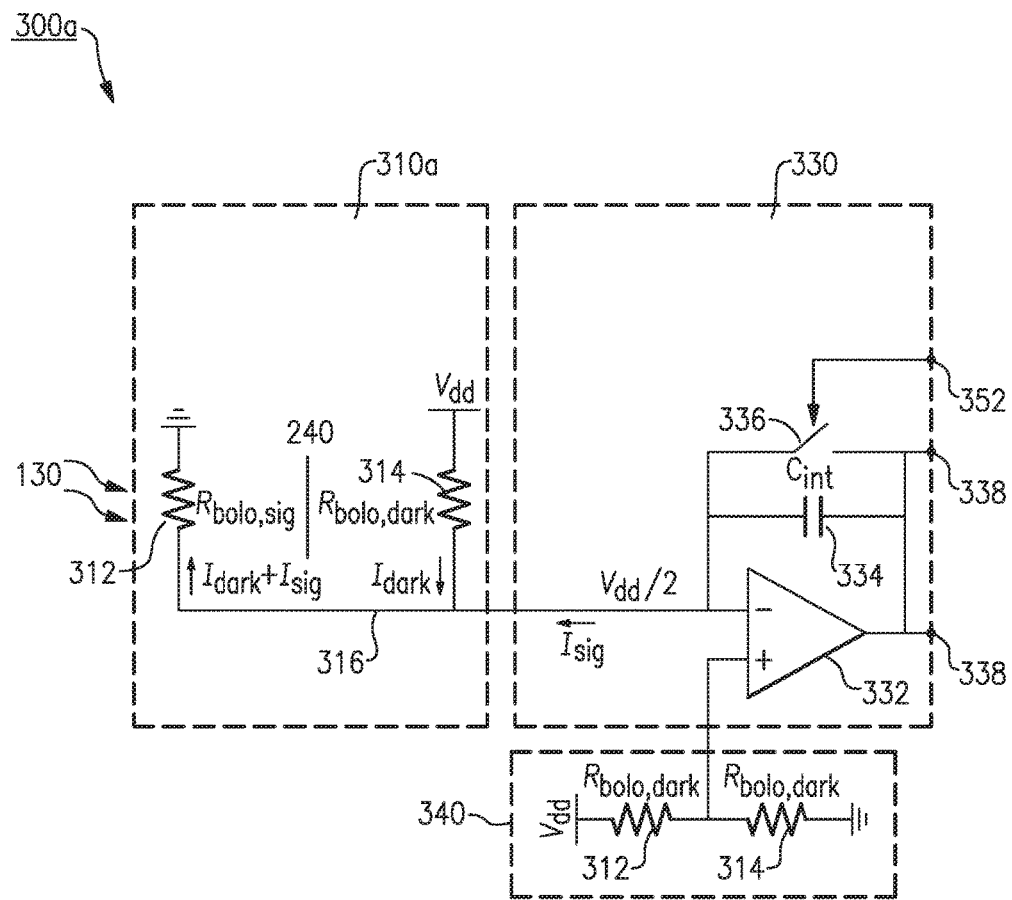
FIG. 6 is a circuit diagram of another example of a thermal imaging device according to aspects of the present invention.
Figure 7:
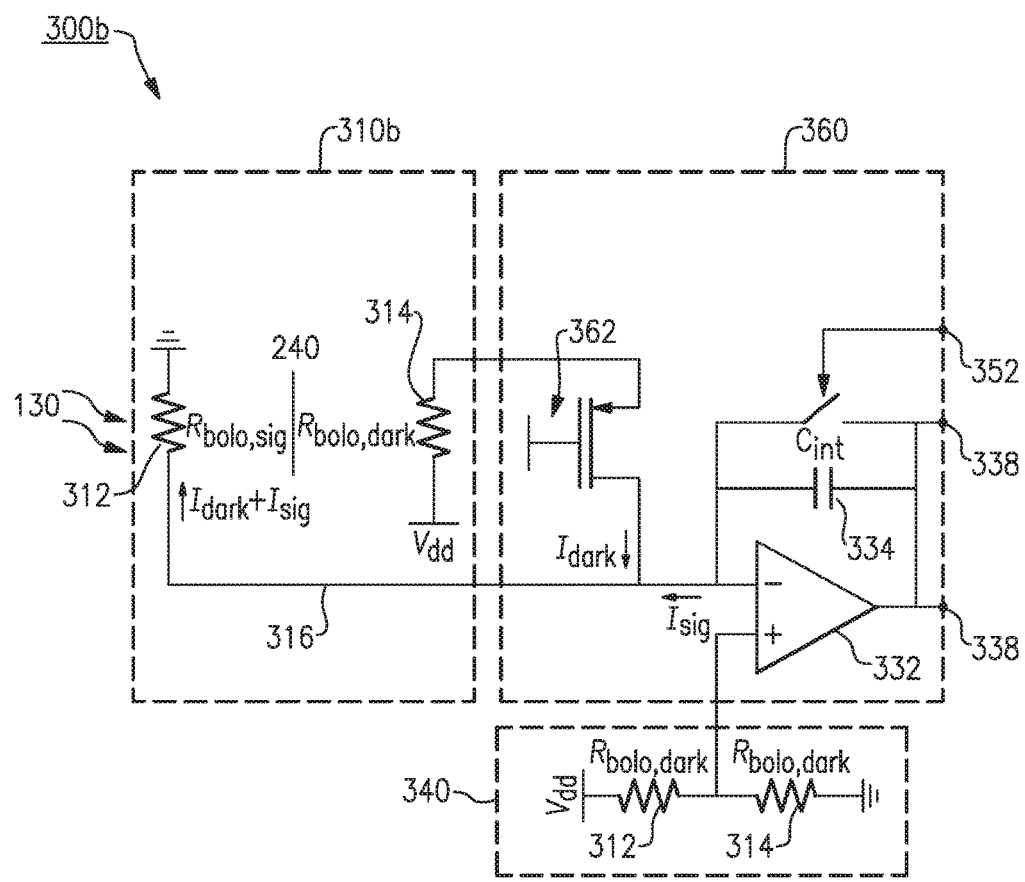
FIG. 7 is a circuit diagram of another example of a thermal imaging device according to aspects of the present invention.

As discussed above, the reference signal produced by the reference resistor/microbolometer can be used to remove the thermal noise component from the signal produced by the imaging microbolometer in each detector element 112. FIGS. 5-7 are circuit diagrams of various examples of circuitry that can be configured to perform this function.

Referring to FIG. 5, a thermal imaging device 300 includes a thermal sensor 310 coupled to circuitry 320. The thermal imaging device 300 corresponds to each detector element 112 in the FPA 110. The thermal sensor 310 includes an imaging microbolometer 312 (corresponding to the imaging structure described above with reference to FIGS. 3 and 4) and a reference microbolometer 314 (corresponding to at least the reference resistor 260 discussed above with reference to FIGS. 3 and 4). As discussed above, the imaging microbolometer 312 and the reference microbolometer 314 can be configured such that their resistance values $R_{bolo,sig}$ and $R_{bolo,dark}$, respectively, are essentially the same. Moreover, as discussed above, the imaging microbolometer 312 receives the incident electromagnetic radiation 130 from the viewed scene. The reference microbolometer 314 is shielded from receiving the electromagnetic radiation 130 by the reflector 240. The reference microbolometer 314 is connected to a voltage source $V_{dd}$ and produces a signal, $I_{dark}$, that is representative of the thermal noise in the detector element 112. The imaging microbolometer 312 produces a signal, $I_{sig}+I_{dark}$ that includes both a component representative of the scene response, namely the signal of interest ($I_{sig}$), and a component that is due to the thermal noise ($I_{dark}$). As discussed above, the imaging microbolometer 312 and the reference microbolometer 314 are configured such that the noise response ($I_{dark}$) is essentially the same from both devices. In the example shown in FIG. 5, the circuitry 320 includes a pair of transistors 322, 324 connected together. In the illustrated examples, the first transistor 322 is a p-channel field effect transistor (FET) having a voltage $V_{dd}-V_{bias}$ applied at its source, and the second transistor 324 is an n-channel FET having a voltage $V_{bias}$ at its source. However, those skilled in the art will readily appreciate that the circuitry 320 may be modified such that the first transistor 322 is an n-channel FET and the second transistor is a p-channel FET, or such that other types and/or configurations of transistors are used. The first transistor 322 receives the reference signal $I_{dark}$ from the reference microbolometer 314 and the second transistor 324 receives the combined signal $I_{sig}+I_{dark}$ from the imaging microbolometer 312. The transistors 322, 324 are connected such that the reference signal $I_{dark}$ is subtracted from the combined signal $I_{sig}+I_{dark}$, and the signal of interest (scene response) $I_{sig}$ is provided at an output contact 326. From the output contact 326, the signal of interest $I_{sig}$ can be provided to components of the ROIC 170 or an external device. The circuitry 320 may be implemented as part of the detector element 112, in the ROIC substrate 120, as part of the ROIC 170, or a combination thereof.

Referring to FIG. 6 there is illustrated another example, 300a, of the thermal imaging device. In this example, the thermal imaging device 300a includes a variation, 310a, of the thermal sensor coupled to circuitry 330. In the thermal sensor 310a, the imaging microbolometer 312 is connected between a signal line 316 and ground, and the reference microbolometer 314 is connected between a voltage source $V_{dd}$ and the signal line 316. As discussed above, the imaging microbolometer 312 and the reference microbolometer 314 can be configured such that their resistance values, $R_{bolo,sig}$ and $R_{bolo,dark}$, respectively, are essentially the same. Accordingly, the voltage on the signal line 316 may be approximately $V_{dd}/2$. In the example shown in FIG. 6, the circuitry 330 includes a comparator 332 having one terminal connected to the signal line 316, as shown. Thus, the signal of interest, $I_{sig}$, is supplied to the comparator 332. The comparator 332 receives an aggregate reference signal at its other terminal from an aggregate reference device 340, and supplies an output corresponding to the difference between the signal of interest, $I_{sig}$, and the aggregate reference signal at an output contact 338. In one example the aggregate reference device 340 is a per-row reference for the FPA 110; however, in other examples the aggregate reference device 340 may be a per-column reference for the FPA 110. The aggregate reference device 340 includes an imaging microbolometer 312 and a reference microbolometer 314 connected in series between $V_{dd}$ and ground, as in the thermal sensor 310a.

In the example shown in FIG. 6, the circuitry 330 further includes an integration capacitor 334 connected across the comparator 332 between the signal line 316 and the output contact 338. A switch 336 is connected in parallel with the integration capacitor 334, and is controlled (switched between an open state and a closed state) by a control signal received via a control contact 352. The integration capacitor 334 may integrate the charge received on the signal line 316 (corresponding to the signal of interest $I_{sig}$) during an integration cycle of the detector element 112, and output the integrated signal at the output contact 338 when the switch 336 is open. As in the case of the circuitry 320 discussed with reference to FIG. 5, the circuitry 330 may be implemented as part of the detector element 112, in the ROIC substrate 120, as part of the ROIC 170, or a combination thereof. In certain examples, the circuitry 330 is repeated for each detector element 112 in the FPA 110, but the aggregate reference device 340 is shared among a plurality of detector elements 112.

FIG. 7 illustrates another variation 300b of the thermal imaging device. In this example, the thermal sensor 310b is the same as the thermal sensor 310a of FIG. 6 and the circuitry 360 is similar to the configuration of circuitry 330 shown in FIG. 6, but also includes a transistor 362 connected to the signal line 316 (and a terminal of the comparator 332) and to the reference microbolometer 314. The reference signal $I_{dark}$ is again subtracted from the combined response ($I_{sig}+I_{dark}$) from the imaging microbolometer 312, and the resulting signal of interest, $I_{sig}$, is provided to the comparator 332. Operation of the thermal imaging device 300b is otherwise as discussed above with reference to the thermal imaging device 300a shown in FIG. 6.

Thus aspects and embodiments provide an uncooled infrared imaging sensors architecture and implementation that incorporates per-pixel NUC. As discussed above, aspects and embodiments include a microbolometer array in which each pixel of the array includes both an imaging microbolometer that receives electromagnetic radiation from a viewed scene and a reference element that is shielded from the scene energy. Accordingly, any output from these reference elements is produced only by noise internal to the imaging system (e.g., thermal noise from self-heating of the pixels), not from any incident electromagnetic radiation, and may therefore be used to generate NUC signals. According to certain embodiments, the reference element is made of the same transducer (thermally sensitive) material as the transducer material used in the imaging component of the pixel;

for example, vanadium oxide or amorphous silicon. Further, the geometry of the reference element may be constructed to mimic the geometry of the imaging component. As discussed above, the reference element may include a layer of the thermally sensitive material that is shielded from the scene energy by a reflecting layer and is heat sunk to the ROIC substrate. These features may provide a pixel in which the reference microbolometer produces no scene response, but the response to thermal noise from the reference microbolometer closely tracks the response to thermal noise from the imaging microbolometer, thus providing an excellent match locally to both temperature and resistance changes. This allows for very local impacts to be compensated for on a per-pixel basis rather than on a column or a row basis, offering improved performance (e.g., improved signal-to-noise ratio) for the microbolometer array.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A thermal imaging device comprising:
a read-out integrated circuit (ROIC) substrate; and
a microbolometer array disposed on the ROIC substrate and including a plurality of detector elements arranged in a two-dimensional array, each detector element including an imaging microbolometer and a reference microbolometer, the imaging microbolometer being configured to receive electromagnetic radiation from a viewed scene and to produce an image signal in response to receiving the electromagnetic radiation, the image signal including a component produced due to thermal noise in the respective detector element, and the reference microbolometer being shielded from receiving the electromagnetic radiation and configured to produce a reference signal indicative of the thermal noise, each detector element further including circuitry configured to subtract the reference signal from the image signal to produce a corrected image signal, the circuitry including a pair of complementary transistors connected in series between the reference microbolometer and the imaging microbolometer,
wherein the thermal imaging device is configured to produce an image of the viewed scene from the corrected image signals from the plurality of detector elements.

2. The thermal imaging device of claim 1 wherein the imaging microbolometer of each detector element includes a layer of thermally sensitive material suspended above the ROIC substrate, and wherein the reference microbolometer of each detector element includes a reference resistor made of the thermally sensitive material.

3. The thermal imaging device of claim 2 wherein the thermally sensitive material is vanadium oxide.

4. The thermal imaging device of claim 2 wherein the reference bolometer is configured with a resistance value equal to a resistance value of the layer of thermally sensitive material.

5. The thermal imaging device of claim 2 wherein the reference resistor is disposed on the ROIC substrate, and wherein each detector element further includes a layer of infrared reflecting material disposed over the reference resistor and configured to shield the reference microbolometer from receiving the electromagnetic radiation.

6. The thermal imaging device of claim 5 wherein the infrared reflecting material is aluminum.

7. The thermal imaging device of claim 1 wherein the electromagnetic radiation is infrared radiation having wavelengths in a range of 8-12 micrometers.

8. The thermal imaging device of claim 1 further comprising a ROIC implemented in the ROIC substrate and coupled to the microbolometer array, the ROIC being configured to process the image signals and the reference signals from the plurality of detector elements to produce the image of the viewed scene.

9. A thermal imaging method comprising:
receiving electromagnetic radiation from a viewed scene at an imaging microbolometer of each of a plurality of detector elements of a microbolometer array;
producing, from the imaging microbolometer included in each of the plurality of detector elements, an image signal from a combination of the received electromagnetic radiation and thermal noise in the respective detector element;
producing, from a reference microbolometer included in each of the plurality of detector elements, a reference signal based on the thermal noise, the reference microbolometer being shielded from receiving the electromagnetic radiation;
for each detector element, subtracting the reference signal from the image signal using a pair of complementary transistors connected in series between the reference microbolometer and the imaging microbolometer to produce a corrected image signal; and
producing an image of the viewed scene based on the corrected image signals from the plurality of detector elements.

10. The thermal imaging method of claim 9 wherein receiving the electromagnetic radiation from the viewed scene includes receiving infrared radiation having wavelengths in a range of 8-12 micrometers.

11. A thermal imaging device comprising:
a read-out integrated circuit (ROIC) substrate;
a microbolometer array disposed on the ROIC substrate and including a two-dimensional array of detector elements, each detector element including:
a reference resistor formed on a first surface of the ROIC substrate, the reference resistor being formed of a thermally sensitive material and configured to produce a reference signal representative of thermal noise in the detector element,
a reflector disposed over the reference resistor and the first surface of the ROIC substrate, the reflector being formed of an infrared reflecting material and configured to shield the reference resistor from receiving electromagnetic radiation from a scene viewed by the microbolometer array, and
an imaging microbolometer suspended above the reflector and thermally isolated from the ROIC substrate by a pair of thermal isolation legs, the imaging microbolometer including a layer of the thermally sensitive material supported by a support layer, and being configured to receive the electromagnetic radiation from the viewed scene and to produce an image signal based on the received electromagnetic radiation and the thermal noise in the detector element; and circuitry formed in the ROIC substrate and coupled to the microbolometer array and configured to, for each detector element, subtract the reference signal from the image signal to produce a corrected image signal, and to produce an image of the viewed scene based on the corrected image signals from the plurality of detector elements, the circuitry including a pair of complementary transistors connected in series between the reference microbolometer and the imaging microbolometer.

12. The thermal imaging device of claim 11 wherein the thermally sensitive material is vanadium oxide.

13. The thermal imaging device of claim 11 further comprising a lid wafer coupled to the ROIC substrate and configured to provide a cavity over the microbolometer array, the lid wafer including a region that is optically transparent to the electromagnetic radiation to allow the electromagnetic radiation to be received at the microbolometer array.

14. The thermal imaging device of claim 11 wherein the electromagnetic radiation is infrared radiation having wavelengths in a range of 8-12 micrometers.

15. The thermal imaging device of claim 11 wherein the infrared reflecting material is aluminum.

16. The thermal imaging device of claim 11 wherein the reference resistor has a resistance value equal to a resistance value of the layer of the thermally sensitive material in the imaging microbolometer.

17. The thermal imaging device of claim 11 wherein the support layer is silicon nitride.

18. The thermal imaging device of claim 11 wherein the support layer includes a plurality of holes.

* * * * *